United States Patent
Gavrilov et al.

(10) Patent No.: US 11,157,312 B2
(45) Date of Patent: Oct. 26, 2021

(54) INTELLIGENT INPUT/OUTPUT OPERATION COMPLETION MODES IN A HIGH-SPEED NETWORK

(71) Applicant: International Business Machines Corporation, Armonk, NY (US)

(72) Inventors: Constantine Gavrilov, Rishon LeZion (IL); Jonathan Amit, Omer (IL); Leonid Chernin, Tel-Aviv (IL); Alex Snast, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 16/132,722

(22) Filed: Sep. 17, 2018

(65) Prior Publication Data
US 2020/0089527 A1    Mar. 19, 2020

(51) Int. Cl.
*G06F 9/48* (2006.01)
*H04L 12/801* (2013.01)
*H04L 12/863* (2013.01)
*G06F 9/54* (2006.01)

(52) U.S. Cl.
CPC .......... *G06F 9/4881* (2013.01); *G06F 9/4812* (2013.01); *G06F 9/546* (2013.01); *H04L 47/29* (2013.01); *H04L 47/50* (2013.01)

(58) Field of Classification Search
CPC ...... G06F 9/4881; G06F 9/4812; G06F 9/546; H04L 47/29; H04L 47/50
See application file for complete search history.

(56) References Cited

U.S. PATENT DOCUMENTS

| | | | | |
|---|---|---|---|---|
| 8,645,558 | B2* | 2/2014 | Pope | G06F 9/546 709/230 |
| 9,485,188 | B2 | 11/2016 | Birke et al. | |
| 10,013,278 | B2* | 7/2018 | Fee | G06F 9/4843 |
| 2012/0254484 | A1* | 10/2012 | Yang | G06F 9/545 710/47 |
| 2012/0310991 | A1* | 12/2012 | Frantz | G06F 16/284 707/799 |
| 2014/0280709 | A1* | 9/2014 | Li | H04L 67/10 709/217 |

(Continued)

OTHER PUBLICATIONS

Sur, Sayantan et al., "Shared Receive Queue Based Scalable MPI Design for InfiniBand Clusters", IEEE, 20th International Parallel and Distributed Processing Symposium (IPDPS 2006), Rhodes Island, Greece, Apr. 25-29, 2006, 10 pages.

*Primary Examiner* — Doon Y Chow
*Assistant Examiner* — Phuong N Hoang
(74) *Attorney, Agent, or Firm* — Francis Lammes; Stephen J. Walder, Jr.; Tihon Poltavets

(57) ABSTRACT

Mechanisms are provided for implementing intelligent input/output (I/O) operation completion modes in a high-speed network. An application thread executing on a central processing unit in the data processing system, receives a first indication to enter a mode of operation. The application thread enters the mode of operation, arms an arm file descriptor, and processes further completions that enter the completion queue until a second indication is received indicating that the mode is to be exited. Responsive to receiving the second indication to exit the mode, the application thread exits the mode of operation and disarms the arm file descriptor.

20 Claims, 5 Drawing Sheets

(56) References Cited

U.S. PATENT DOCUMENTS

| | | |
|---|---|---|
| 2016/0026604 A1* | 1/2016 | Pandit ................ G06F 15/17 |
| | | 709/212 |
| 2016/0128077 A1 | 5/2016 | Tsirkin |
| 2017/0097783 A1* | 4/2017 | Craddock .......... G06F 13/1689 |
| 2018/0004664 A1* | 1/2018 | Craddock .......... G06F 12/1027 |
| 2020/0050478 A1* | 2/2020 | Underwood ......... G06F 9/4881 |

* cited by examiner

INTELLIGENT INPUT/OUTPUT OPERATION COMPLETION MODES IN A HIGH-SPEED NETWORK

BACKGROUND

The present application relates generally to an improved data processing apparatus and method and more specifically to mechanisms for implementing intelligent input/output (I/O) operation completion modes in a high-speed network.

Interconnect devices, such as a host controller, host adapter, host bus adapter (HBA), Host Channel Adapter (HCA), or the like, connect a managed system to other devices utilizing port connections. These ports may be connected to another interconnect device, target device, or switch that redirects the data coming in on one of its ports out to a device attached to another of its ports. Modern interconnect devices are powerful. For example, a 100 gigabit (Gbit) single full duplex interconnect device can perform 6 million input/output operations per second (IOPS) for input/output (I/O) operations that are 4 kilobytes (KiB) in size, and dual ports interconnect devices are capable of 100 Gbit/sec per port are shipping. Multiple interconnect devices per server are also a reality, since modern cloud and storage applications push limits for required I/O bandwidth and message rate.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for implementing intelligent input/output (I/O) operation completion modes in a high-speed network. The illustrative embodiment receives a first indication to enter a mode of operation. The illustrative embodiment enters the mode of operation. The illustrative embodiment arms an arm file descriptor. The illustrative embodiment processes further completions that enter the completion queue until a second indication is received indicating that the mode is to be exited. The illustrative embodiment exits the mode of operation in response to receiving the second indication to exit the mode. The illustrative embodiment then disarms the arm file descriptor. In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
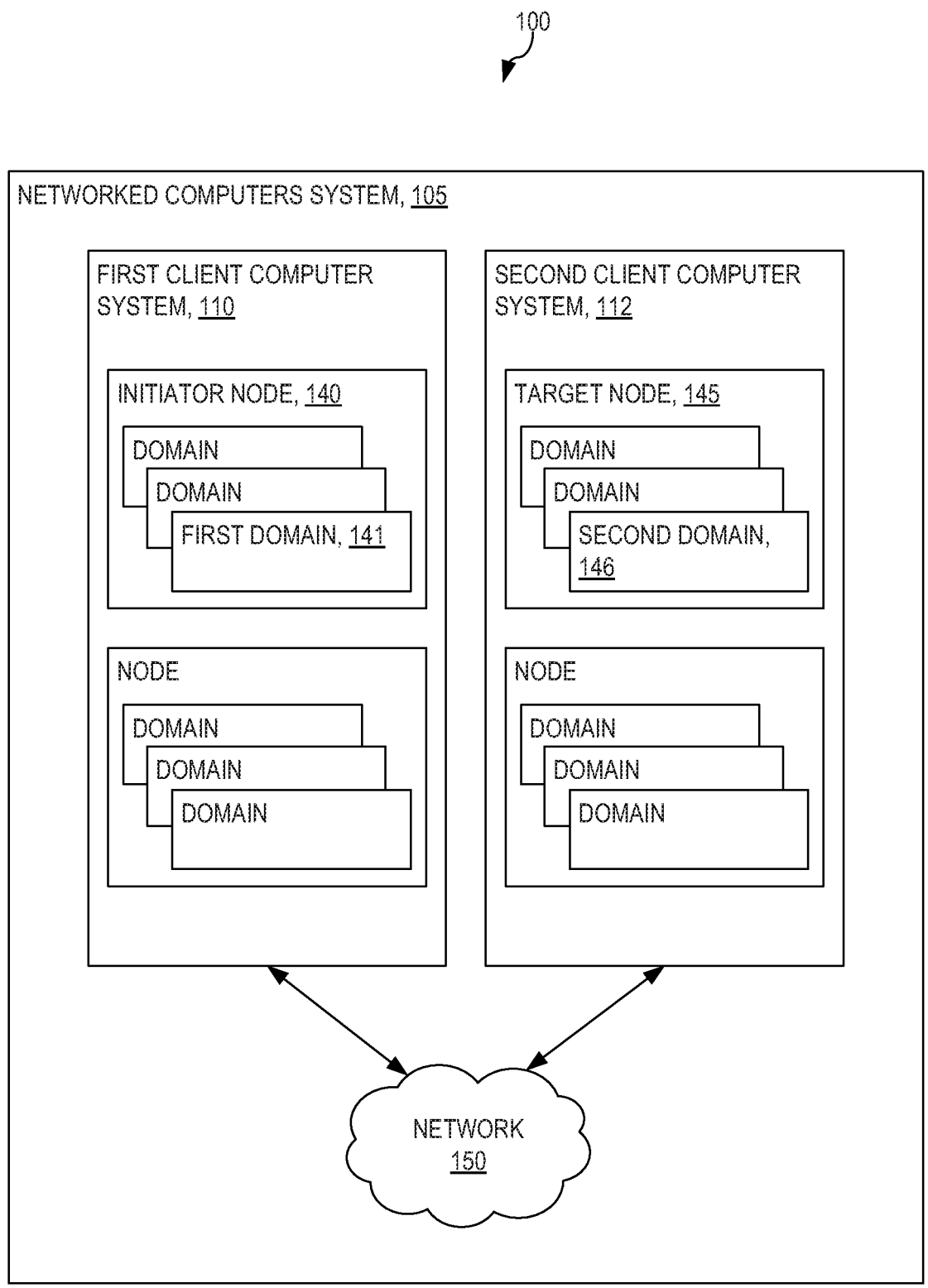
FIG. 1 is a functional block diagram depicting one example of a computing environment in which aspects of the illustrative embodiments may be implemented.

Again, modern interconnect devices are powerful. For example, a 100 gigabit (Gbit) single full duplex interconnect device can perform 6 million input/output operations per second (IOPS) for input/output (I/O) operations that are 4 kilobytes (KiB) in size, and dual ports interconnect devices are capable of 100 Gbit/sec per port are shipping. Multiple interconnect devices per server are also a reality, since modern cloud and storage applications push limits for required I/O bandwidth and message rate.

However, it is not possible to process that many transactions on a single central processing unit (CPU), using one hardware queue of the interconnect device when also taking into account application callbacks. Modern interconnect devices have up to 128 hardware queues, while modern commodity servers have 40-100 CPUs. A feasible solution for utilizing high speed interconnect device power is to use multi-domain approach, where different applications threads bind to a private CPU, open a private device context, have private connections, and bind to private hardware queues, signaled by private interrupt lines serviced by the same CPUs that application threads are bound to. This allows lock-free operations within each application thread, since application threads do not share interconnect device contexts.

Interconnect devices generate completions for I/O events. Receive events always generate completions, while send completions are generated upon request. To detect completions, polling or interrupt request (IRQ) modes may be used. In polling mode, interrupts are not turned on and the application executing on the CPU checks memory registered with interconnect device for available completions (no system calls are involved). In IRQ mode, completion queues are tied to event channels—a file descriptor that can be used to wait and read the queue events. Typical implementations do not assume one-to-one relation, and single event channel can provide information about multiple completion queues. In IRQ mode, applications executing on the CPU arm the completion queue—request an interrupt for next event in the completion queue. When one or more completions become available, the interconnect device generates an interrupt and CPU processing is thus interrupted to address the completion(s). During interrupt processing, the event channel completion file descriptor associated with the queue is marked as readable. Applications can thus wait for completions by waiting for the event channel file descriptor to become readable (using select( ), poll( ), or epoll_wait( ) system calls). Since typical implementations do not assume one-to-one relation between event channel and completion queue, a read system call must be used to determine which queue has completions (and to free the kernel event), when the event channel becomes readable. Upon return from the read system call, the application knows which completion queue has completions and it may proceed to clean completions from the memory, registered with the interconnect device, without invoking system calls. If more completions arrive between generation of the interrupt and reading completions, they will not generate interrupts, but will be seen and processed by the application when the completion queue memory is examined, resulting in effect of interrupt coalescing—servicing several completions by one interrupt. At the end of the process, the application arms the completion queue again (requests delivery of an interrupt for next I/O event).

Therefore, powerful interconnect devices (100 GBit/sec and multiple ports), challenge the practicality of using interrupt mode. Each completion interrupt has a latency of its own, and requires a read( ) system call, which has a latency between 1.5 and 2 microseconds. Furthermore, waiting for the event is a system call as well, that has the same latency as read( ). When processing traffic is split among so many threads (up to 100), each thread can receive many messages, but not enough for interrupt coalescing to work, if application I/O processing callbacks take much less time than the intervals between I/O events. For example, 50 thousand I/O operations per second (KIOPS) will not show interrupt coalescing if I/O processing takes 1-2 microseconds. At the same time, the penalty of interrupt mode for so many I/Os may consume up to 10% of CPU time. While send completions penalties may be minimized by not requesting completions for traditional storage protocols that do request-wait-for-response sequence, penalties cannot be avoided for receive messages and for send messages used in push-to-push protocols.

As it stands, 5-10% of each CPU is wasted for interrupt processing under load. Alternative is to use full polling, which is not feasible in multi-domain approach. With multi-domain approach, all CPUs are not allowed to spin at 100% polling for completions. That is, allowing CPU to spin at 100% is not good for power consumption and poses questions how applications will do something else (how they will switch to other tasks and back to polling).

Thus, the illustrative embodiments provide mechanisms for implementing intelligent input/output (I/O) operation completion modes in a high-speed network. A level mode optimizes short bursts of data to reduce CPU consumption and I/O latency for short bursts of data. The level mode works under assumption that, upon receiving a first completion, next completions are expected within at least a given time interval Applications may specify this value for each completion queue of the domain (zero value means the feature is not used). An edge mode optimizes heavy loads, including specifying and modifying edge mode parameters, where edge mode parameters may be determined via calibration. Automatic switching between interrupt request mode, level mode, and edge mode may be based on one or more of application request, message rate, or application load. Switching from interrupt request mode to polling mode or from polling mode to interrupt request mode is also provided. A hybrid mode may also be implemented that utilizes a polling mode together with an IRQ mode for non-urgent requests.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
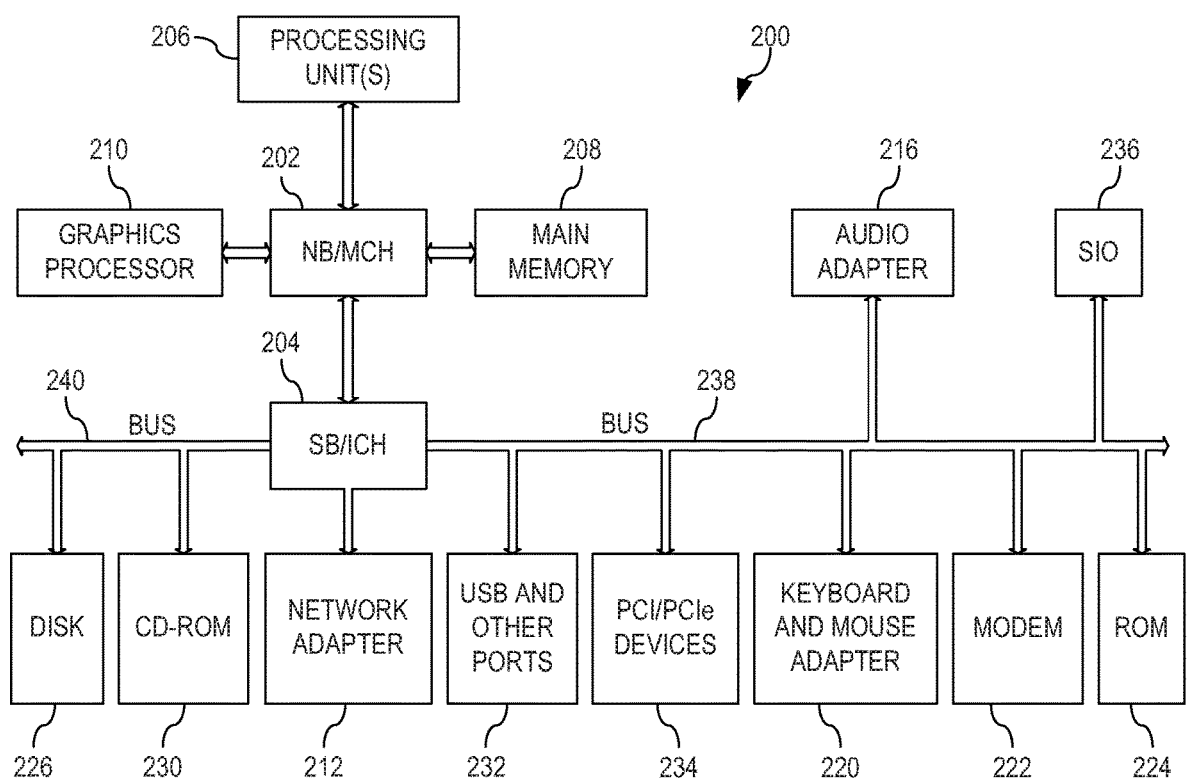
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is a functional block diagram depicting one example of a computing environment 100 in which aspects of the illustrative embodiments may be implemented. Computing environment 100 includes: networked computers system 105; first client computer system 110; second client computer system 112; initiator node 140; first domain 141; target node 145; second domain 146; and network 150. There may be any number of nodes, including for example initiator node 140, within first client computer system 110. There may be any number of nodes, including for example target node 145, within second client computer system 112. Moreover, within each node (for example, initiator node 140 and target node 145), there may be any number of domains (for example respectively, first domain 141, and second domain 146). Client computer system 110 and client computer system 112 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions.

In some embodiments of the present invention, first and second client computer systems (110 and 112 respectively), communicate using InfiniBand standards and protocols. Any domain (for example, first domain 141) can communicate with any other domain (for example, second domain 146) within networked computers system 105. First domain 141 and second domain 146 may be on the same node, different nodes on the same client computer system, or on nodes on different client computer systems (for example initiator node 140 and target node 145 as shown in FIG. 1). In some embodiments: (i) a node is an application running on a client computer system (for example initiator node 140 running on first client computer system 110); and (ii) a domain (for example first domain 141) is an instance (potentially among many instances) of the application running on the first client computer system 110).

In the depicted example, computing environment 100 may be a part of the Internet with network 150 representing a worldwide collection of networks and gateways that use various protocols to communicate with one another. At the heart of the Internet is a backbone of high-speed data communication lines between major nodes or host computers, consisting of thousands of commercial, governmental, educational and other computer systems that route data and messages. Of course, computing environment 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., first client computer system 110 or second client computer system 112, may be specifically configured to implement intelligent input/output (I/O) operation completion modes in a high-speed network. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates implementing intelligent input/output (I/O) operation completion modes in a high-speed network.

As noted above, the mechanisms of the illustrative embodiments utilize specifically configured computing devices, or data processing systems, to perform the operations for implementing intelligent input/output (I/O) operation completion modes in a high-speed network. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller huh (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while Pete does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7® or a variant of Linux system, like RedHat Enterprise Linux or SuSe enterprise Linux. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the implementing intelligent input/output (I/O) operation completion modes in a high-speed network.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
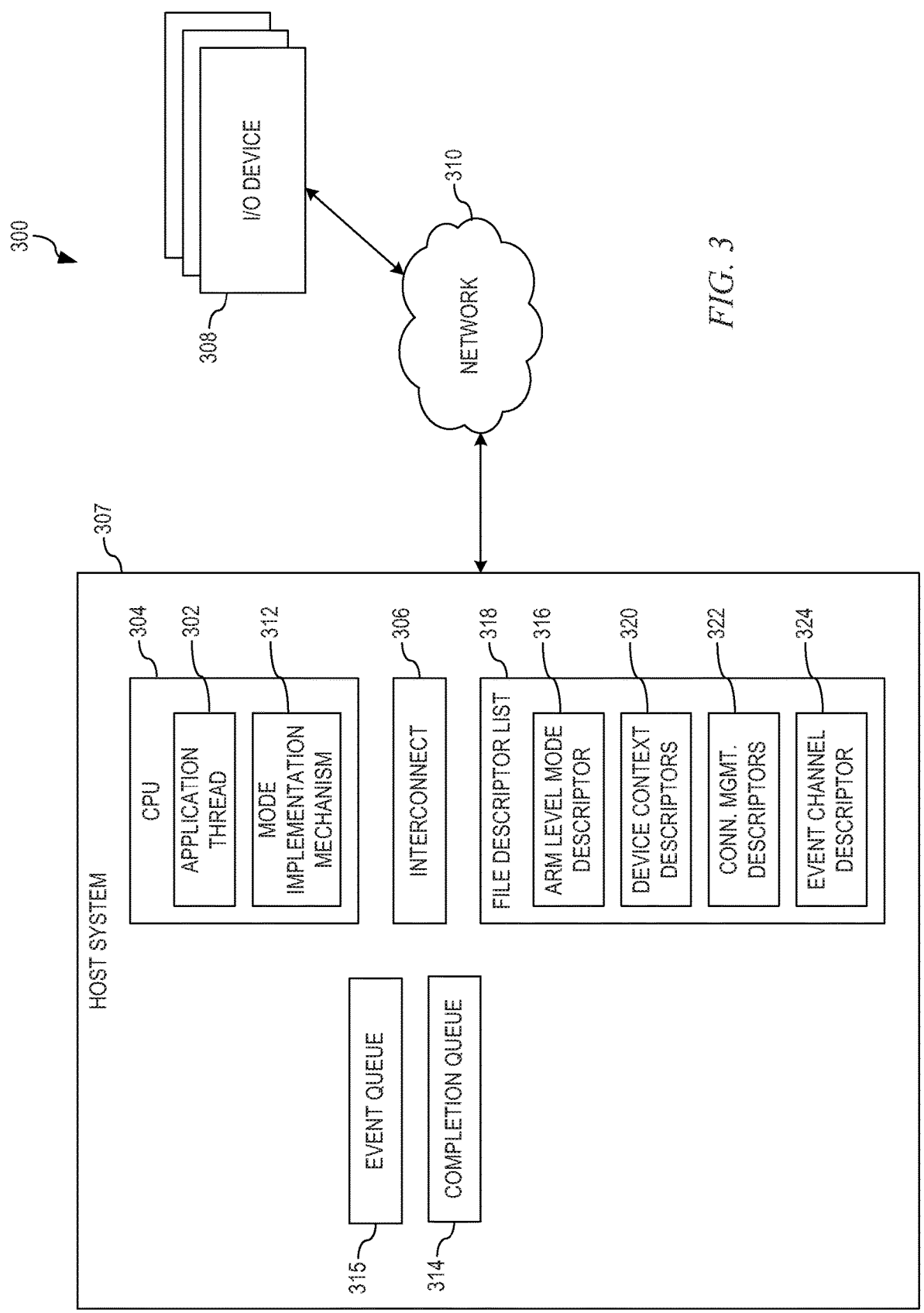
FIG. 3 depicts an exemplary block diagram for implementing intelligent input/output (I/O) operation completion modes in a high-speed network in accordance with an illustrative embodiment.

FIG. 3 depicts an exemplary block diagram for implementing intelligent input/output (I/O) operation completion modes in a high-speed network in accordance with an illustrative embodiment. Data processing system 300 comprises application thread 302, which is executing on central processing unit (CPU) 304, and interconnect device 306 within host system 307. Data processing system 300 also comprises input/output (I/O) devices 308 coupled to interconnect device 306 via network 310. Interconnect device 306, which may be a host controller, host adapter, host bus adapter (HBA), Host Channel Adapter (HCA), or the like, couples to I/O device 308 utilizing port connections. Each port may be connected to another interconnect device, a target I/O device, or a switch that redirects the data coming in on one of its ports out to a device attached to another of its ports.

In order to address CPU consumption and I/O latency associated with current polling modes and interrupt request (IRQ) modes utilized to address I/O operation completions, the illustrative embodiments provide mode implementation mechanism 312. In accordance with the illustrative embodiments, mode implementation mechanism 312 implements two new intelligent I/O operation completion modes, i.e. a level mode and an edge mode that may be utilized alone or in conjunction with an IRQ mode. The level mode optimizes short bursts of data to reduce CPU consumption and I/O latency for short bursts of data. The level mode works under assumption that, upon receiving a first completion, next completions are expected within at least a given time interval. Application thread 302 may specify this value for each completion queue associated with application thread 302 (zero value means the feature is not used). For performance reasons, application thread 302 may use its own device context, private connections, event queue 315, completion queue 314, or the like. Completion queue 314 points to the application memory registered with interconnect device 306 and is used to receive and process interconnect device events. Event queue 315 points to memory registered with interconnect device 306 and is used to receive and process interrupt notification events. For performance reasons, application thread 302 may be pinned to CPU 304, and the event queue 315 may be pinned to the same CPU 304. This effectively makes completion queue 314 pinned to the same CPU 304 and fully eliminates lock contention between application thread 302 that processes completion queue 314 and event queue 315 and interrupts. Also, resource contention between multiple application threads is eliminated.

Application thread 302 uses a list of file descriptors to process various events. For example, one file descriptor associated with the device context may be used to receive and process device events (port events like port up or down, or object events like connection in error). Another file descriptor may be associated with the connectivity manager device handle, opened in the context of interconnect device 306. This descriptor is used to send, receive, and process connectivity events. Another file descriptor may be associated with the event queue of the device, and specifies connection to a given interrupt line (this descriptor is mentioned as event channel earlier). Event channel descriptor may be used to receive and process interrupt events. Use of mode implementation mechanism 312 assumes a use of additional descriptor coupled with each completion queue 314. Arm level mode descriptor 316 is used for arming or disarming the level mode. Some interconnect device implementations can use event channel descriptor for this purpose. This is possible, if one-to-one context relation is established between event channel and completion queue, and no special read operation from event channel is required to determine the completion queue for which interrupt has arrived. If interconnect device 306 does not allow use of event channel for this purpose, a simple event file descriptor that can be armed by writing and disarmed by reading may be created for each completion queue.

When application thread 302 initializes, application thread 302 creates the file descriptor list 318 to wait for future events. Application thread 302 also creates arm level mode descriptor 316, device context descriptors 320, connection management descriptors 322, and event channel descriptors 324, and adds them to file descriptor list 318. The main loop of the application is to wait for file descriptor events and process the events.

When interconnect device 306 receives a first completion to one of the plurality of I/O operations, interconnect device 306 arms the event channel descriptor 324 (writes to it), which causes an event that is noticed by application thread 302. When level mode is used, arm level mode descriptor 316 is also armed (if it is different from event channel). Realizing that other completions may follow, application thread 302 processes the completion queue but application thread 302 does not disarm arm level mode descriptor 316 as would normally be performed in the classic IRQ mode.

That is, realizing that other completions may soon follow the completion that initially armed arm level mode descriptor 316, the arming of arm level mode descriptor 316 by interconnect device 306 remains armed for a predetermined time interval, which is indicated by application thread 302 at the time the plurality of I/O operation were issued to interconnect device 306. Since arm level mode descriptor 316 remains armed, once the application returns to the main loop, application thread 302 still sees the same event and continues to process completions from the same completion queue.

During this predetermined time interval, interconnect device 306 does not generate any further interrupts to application thread 302 and application thread 302 processes any other completions that are added to completion queue 314. Utilizing the level mode and the associated predetermined time interval, allows application thread 302 and interconnect device 306 to handle the short bursts of completion data more efficiently than the IRQ mode, where each completion has its own associated interrupt in an interrupt mode, while also not reverting to polling all completion queues. Once the predetermined time interval has expired, mode implementation mechanism 312 disarms arm level mode descriptor 316. The level mode only requires application thread 302 to specify the predetermined time interval that arm level mode descriptor 316 will remain armed such that completions added to completion queue 314 are handled during that predetermined time interval without the need for additional interrupts. The use of level mode does not require main loop flow changes of the application and it may be entirely implemented in the interconnect device code.

Mode implementation mechanism 312 may also implement an edge mode. The edge mode optimizes heavy loads, including specifying and modifying edge mode parameters, where edge mode parameters may be determined via calibration. That is, mode implementation mechanism 312 utilizes the edge mode for reducing CPU consumption and I/O latency, when message processing or application callbacks performed by interconnect device 306 result in high CPU usage. In the edge mode, no system calls or interrupts are used to process I/O events. That is, upon initialization, each application thread 302 is given three parameters: a sampling interval, a message rate at which interconnect device 306 is expected to produce significant load (may be determined automatically via calibration), and a poll rate at which interconnect device 306 will penalize application thread 302 (may also be determined automatically via calibration).

Edge mode implementation requires changes to main thread loop. In the edge mode, mode implementation mechanism 312 may hint or request the application to switch between a polling mode and an IRQ mode. When in polling mode, the application will not wait for events, but will invoke appropriate application I/O handlers as in the case events have arrived. That is, in one embodiment, interconnect device 306 switches a particular thread to a polling mode such that a time interval at which the completion queue 314 is polled is set to a maximum predetermined value. Interconnect device 306 also arms the arm level mode descriptor 316 for completion queue 314. When in polling mode, application thread 302 processes all completions From completion queue 314 but will not disarm arm level mode descriptor 316. In another embodiment, interconnect device 306 switches a particular thread to an IRQ mode such that a time interval at which the completion queue 314 is polled is set to zero. Thus, when a completion is present in completion queue 314, interconnect device 306 arms the event channel file descriptor for completion queue 314. Then, when an interrupt is received, application thread 302 processes all completions from completion queue 314 and disarms the event channel file descriptor.

In the edge mode, mode implementation mechanism 312 determines whether to utilize the polling mode or IRQ mode based on statistics for a sampling interval. Two instances of statistics are utilized: active sampling interval statistics (one that is currently updated) and last sampling interval statistics (one that was collected over a last sampling interval). When a sampling interval starts, mode implementation mechanism 312 samples thread CPU usage, which is recorded in the active sampling interval statistics. That is, mode implementation mechanism 312 uses each call to interconnect device 306 by application thread 302 for processing completions to update at least the following parameters:

the number of empty calls (entries to processing completions code that had no completions), and the number of processed completions.

At the start and end of the sampling interval, the CPU usage (thread run time) are also sampled, so mode implementation mechanism 312 knows the CPU load of the calling thread during the sampling interval.

When the sampling interval expires, mode implementation mechanism 312 copies the active sampling interval statistics to the last sampling interval statistics and resets the active period statistics. Mode implementation mechanism 312 implements the polling mode if one of the following conditions is true:

the number of processed completions over the last sampling interval is more or equal then the message rate at which interconnect device 306 is expected to produce significant load (specified upon application thread 302 start or calibrated automatically at application thread 302 start), or the thread CPU usage over the last sampling interval is high, i.e. above a predetermined threshold (for example >=90%) and the number of empty calls to completion code is below poll rate at which interconnect device 306 will penalize application thread 302 (the value specified upon application start or calibrated automatically at application start).

In the polling mode, application thread 302 addresses all completions in completion queue without requesting interrupts or system calls (only completion queues memory is checked by application thread 302 and the application I/O callbacks are run) for the predetermined time interval utilized in the edge mode. If either condition is true, mode implementation mechanism 312 indicates that polling mode is still advised. If neither condition is true, mode implementation mechanism 312 indicates the polling mode is not advised.

It has been stated that edge potting mode requires application changes to main application flow. Edge polling mode is used as follows. Application thread 302 operates under assumption that there are important events that need to be processed quickly for performance reasons (I/O completions and associated callbacks) and events that are less sensitive to processing latency (asynchronous port errors, connect or disconnect events, connection errors, etc.). Important interconnect device events may be cleaned using full polling mode, without invoking waiting system calls like epoll( ), epoll_wait( ), select( ), or read( ). However, mode implementation mechanism 312 cannot starve other events while polling for completions (because connection requests, port and connection errors must be processed as well).

Thus, initially, in the edge mode, mode implementation mechanism 312 implements a IRQ mode where:

Application thread 302 waits for events, i.e. I/O completions to enter completion queue 314;

If an I/O completion enters completion queue 314, interconnect device 306 raises an interrupt and mode implementation mechanism 312 gathers statistics and the completions are processed;

Based on the statistics, if mode implementation mechanism 312 determines that either condition identified previously is true, mode implementation mechanism 312 switches to polling mode.

If mode implementation mechanism 312 switches to polling mode, it initializes the polling mode time stamp and runs the following loop:

Application thread 302 polls completion queue 314 and continues to gather statistics;

If mode implementation mechanism 312 determines that either condition identified previously is true indicating that the polling mode is still advised, take time stamp. If maximum allowed time to not poll non-urgent descriptors (for example a value of 50 ms) has passed since last polling mode timestamp, application thread 302 calls wait for events with zero timeout, processes events, and resets polling mode entry time stamp to the current time value.

If polling mode is not advised, mode implementation mechanism 312 switches to IRQ mode, and the loop breaks.

Thus in the edge mode, application thread 302 processes interconnect device completions and other non-urgent events at idle time, and mode implementation mechanism 312 switches to polling mode when message rate is above a given threshold or when CPU usage (not associated with empty calls) is high. When polling edge mode is activated, non-urgent events are processed periodically and are not starved. Thus, if there are many interrupts, and CPU consumption is high, utilizing a polling mode is more efficient.

Automatic switching between the IRQ mode, level mode, and edge mode may be based on one or more of application request, message rate, or application load. Switching from IRQ mode to polling mode or from polling mode to IRQ mode is also provided. A hybrid mode is also provided that utilizes a polling mode together with an IRQ mode for non-urgent requests, where a set of non-urgent descriptors generate interrupt-driven events that are cleared periodically.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
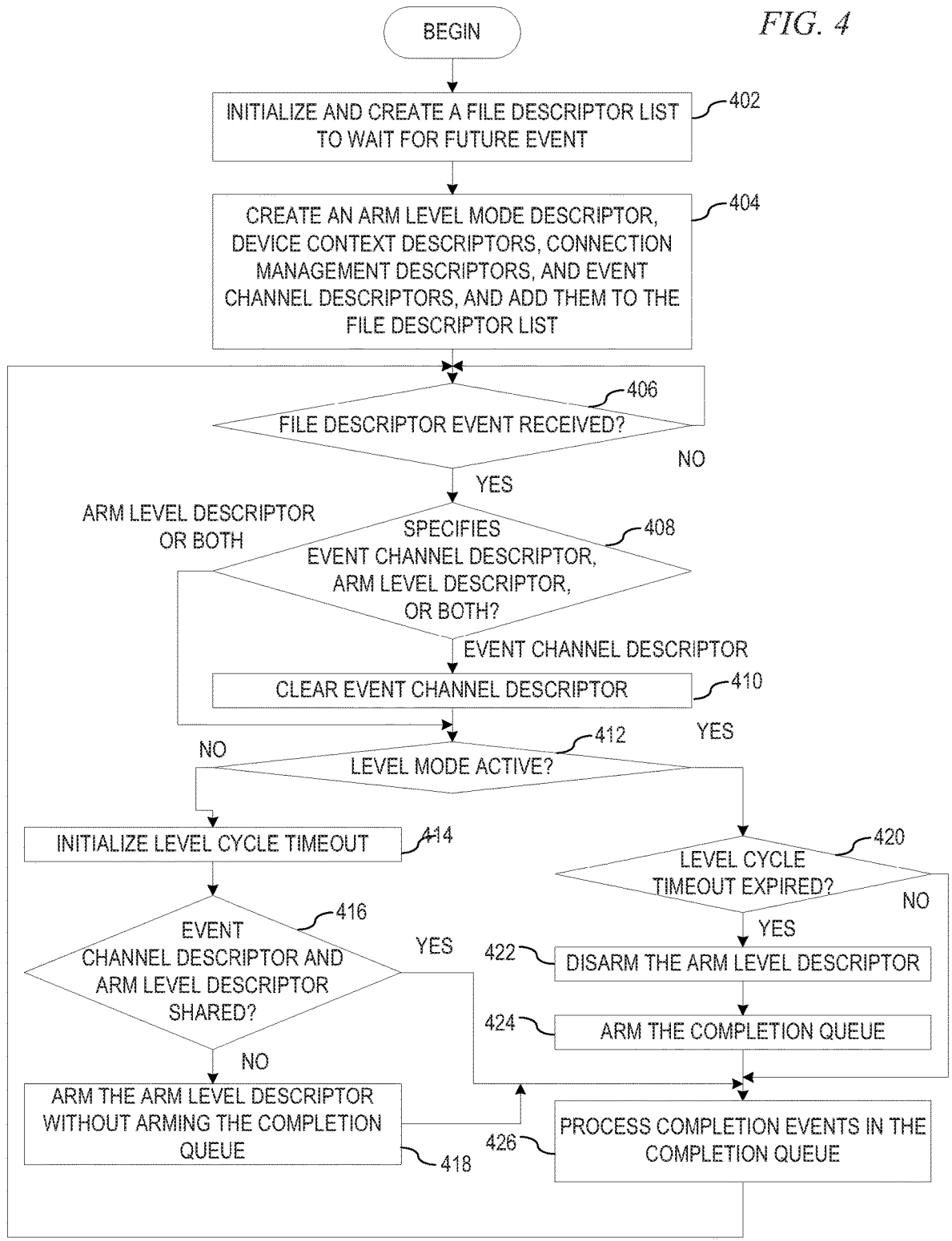
FIG. 4 depicts an exemplary flow diagram of an application, operating in a level mode, addressing completions identified by an interconnect device in accordance with an illustrative embodiment.

FIG. 4 depicts an exemplary flow diagram of an application, operating in a level mode, addressing completions identified by an interconnect device in accordance with an illustrative embodiment. As the operation begins, the application thread initializes and creates a file descriptor list to wait for future event (step 402). The application thread also creates an arm level mode descriptor, device context descriptors, connection management descriptors, and event channel descriptors, and adds them to the file descriptor list (step 404). The application thread then enters a main loop, where a determination is made as to whether a file descriptor event is received (step 406). If at step 406 a file descriptor event is not received, the operation returns to step 406. If at step 406 a file descriptor event is received, the application thread determines whether an event channel descriptor is specified, an arm level descriptor is specified, or both as, in some embodiments, event channel descriptors and arm level descriptors may be shared (step 408). If at step 408 the file descriptor event specifies the event channel descriptor, the application clears event channel descriptor to determine which completion queue has generated the event (step 410). If at step 408 the file descriptor event specifies an arm level descriptor or if an event channel descriptor and an arm level descriptor are specified indicating sharing, the process continues to step 412.

From step 410 or from the determination at step 408 that the file descriptor event specifies an arm level descriptor or both an event channel descriptor and an arm level descriptor, the application thread determines whether a level mode is active (step 412). If at step 412 the application thread determines that the level mode is not active (typical for event channel event), the application thread initializes level cycle timeout (step 414). The level cycle timeout, which is a predetermined time interval, is indicated by the application thread at the time the plurality of I/O operation were issued to the interconnect device. The application thread then determines whether the file descriptor event specifies an event channel descriptor and an arm level descriptor being shared (step 416). If at step 416 the application thread determines the event channel descriptor and the arm level descriptor are not shared, the application thread arms the arm level descriptor (step 418) and proceeds to step 426 without arming the completion queue (without requesting interrupt for next completion event). If at step 416 the application thread determines the event channel descriptor and the arm level descriptor are shared, the arming of the arm level descriptor is skipped, since event channel descriptor has been armed by the device driver, and the application thread proceeds then to step 426.

If at step 412 the application thread determines that the level mode is active (typical for arm descriptor event), the application thread checks whether level cycle timeout has expired (step 420). If at step 420 the application thread determines that the level cycle timeout has expired (the predetermined time interval has passed), the application thread disarms the arm level descriptor (step 422) and arms the completion queue (requests interrupt for next completion event) (step 424) and proceeds to step 426. If at step 420 the application thread determines that the level cycle timeout has not expired, the application proceeds to step 426, without request to arm the completion queue. At step 426, the application thread processes completion events in the completion queue with the operation returning to 406 to wait for next file descriptor events. Thus, when the application thread activates level mode, the application thread realizes that other completions may follow, and thus the application thread processes the completions in the completion queue without requesting further interrupts. That is, realizing that other completions may soon follow the completion that initially caused the event file descriptor to be armed, the application leaves the completion queue unarmed (no interrupts) and arm descriptor armed for a predetermined time interval. Since the arm level mode descriptor remains armed, once the application returns to the main loop, the application thread still sees the same arm event and continues to process completions from the same completion queue.

Therefore, during the predetermined time interval, the interconnect device does not generate any further interrupts to the application and the application processes any other completions that are added to the completion queue. Utilizing the level mode and the associated predetermined time interval allows the application and the interconnect device to handle the short bursts of completion data more efficiently than just using the IRQ mode, where each completion has its own associated interrupt in an interrupt mode, while also not reverting to polling all completion queues. The level mode only requires the application to specify the predetermined time interval that file descriptor will remain armed such that completions added to completion queue are handled during that predetermined time interval without the need for additional interrupts.

Figure 5:
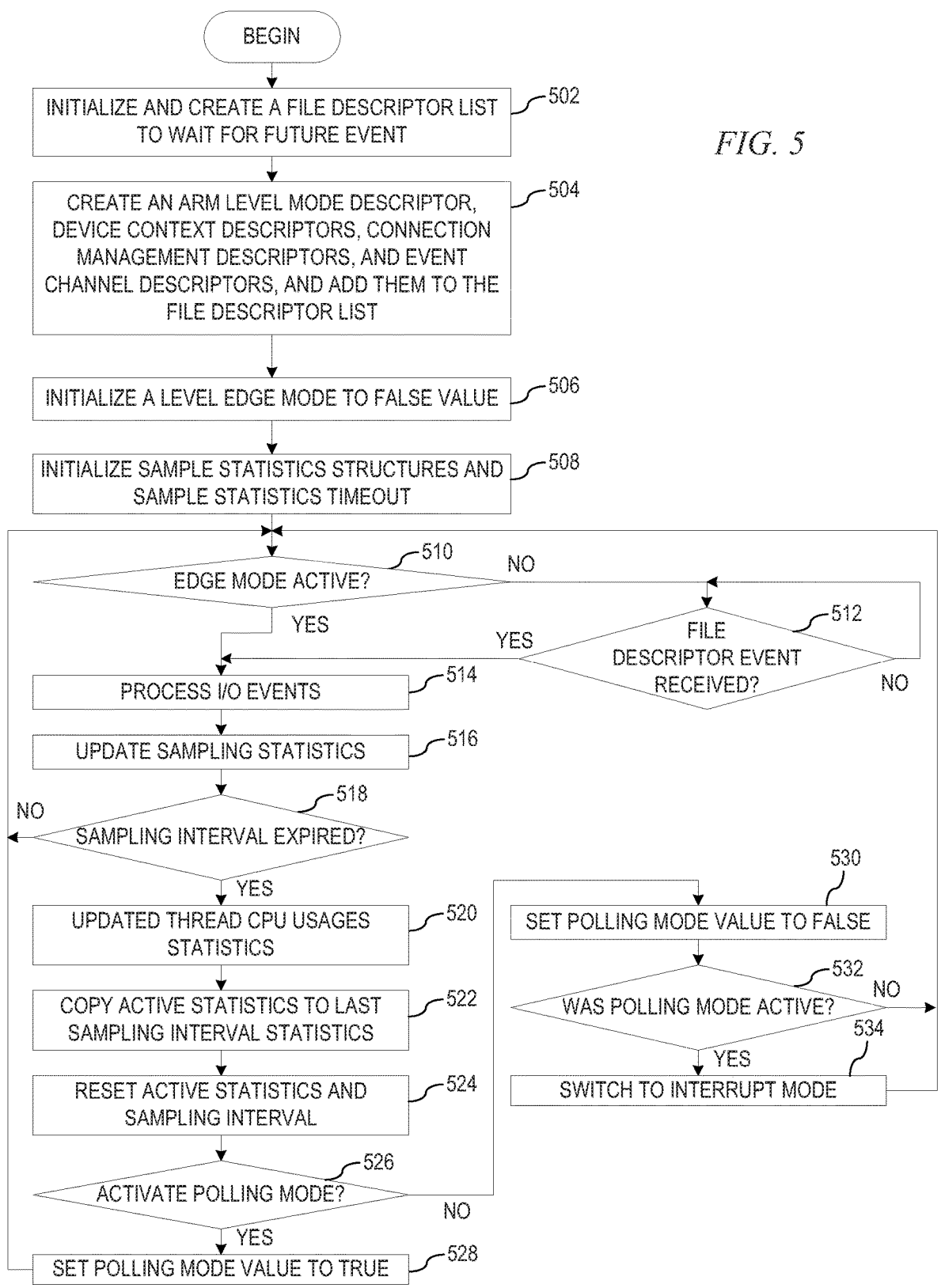
FIG. 5 depicts an exemplary flow diagram of an application, operating an edge mode, addressing completions identified by an interconnect device in accordance with an illustrative embodiment.

FIG. 5 depicts an exemplary flow diagram of an application, operating in an edge mode, addressing completions identified by an interconnect device in accordance with an illustrative embodiment. As the operation begins, the application thread initializes and creates a file descriptor list to wait for future event (step 502). The application thread also creates an arm level mode descriptor, device context descriptors, connection management descriptors, and event channel descriptors, and adds them to the file descriptor list (step 504). The application thread initializes level edge mode to false value (step 506). The application thread initializes sample statistics structures and sample statistics timeout (step 508). The application thread starts a main loop by determining whether an edge mode is active (step 510). If at step 510 the edge mode is not active, the application thread waits for file descriptor events (step 512). If at step 512 the application thread fails to receive a file descriptor, the operation returns to step 512. If at step 512 the application receives a file descriptor event or if at step 510 the edge mode is active the application thread processes IO events (step 514). In edge polling mode, event channel descriptors are not read and completion queues are not armed during processing. If edge polling mode is not active, event channel descriptors are read, and completion queues are armed during event processing. Therefore, the application thread updates sampling statistics (step 516). At least, the application thread updates the number of empty entries to polling loop (which generated no completions) and updates the number of processed completions. The application thread then determines whether a sampling interval has expired (step 518). If at step 518 the application thread determines that the sampling interval has not expired, the operation returns to step 510.

If at step 518 the application thread determines that the sampling interval has expired, the application thread updates thread CPU usages statistics (step 520). The mode implementation mechanism samples thread CPU usage for a sampling interval (taken at the start and end of the sampling cycle), which is recorded in the active sampling interval statistics. The application thread then copies active statistics to last sampling interval statistics (step 522) and resets active statistics and sampling interval (step 524), and reconsiders whether polling mode shall be active (step 526). The mode implementation mechanism implements polling mode if one of the following conditions is true:

the number of processed completions over the last sampling interval is more or equal then the message rate at which the interconnect device is expected to produce significant load (specified upon the application thread start or calibrated automatically at the application thread start), or the thread CPU usage over the last sampling interval is high (for example >=90%) and the number of empty calls to completion code is below poll rate at which the interconnect device will penalize the application thread (the value specified upon application start or calibrated automatically at application start).

If at step 526 the application thread determines that one of the condition are met for polling mode, then the mode implementation mechanism sets polling mode value to true (step 528) with the operation returning to step 510. If at step 526 the application thread determines that neither of the conditions is met for polling mode, the application thread sets edge polling mode value to false (step 530). The application thread determines whether polling mode was active (step 532). If at step 532 the application thread determines that polling mode was not active, the operation returns to step 510. If at step 532 the application thread determines that polling mode was active, the application thread switches to interrupt mode by arming the arm descriptor and the completion queues (step 534), with the operation returning to step 510 thereafter. Arming the arm descriptor is required in order to force entry to processing events, because there may be events that the application has not processed yet, and there are no pending event channel events since interrupts have been disabled.

Therefore, when edge polling mode is active, the interconnect device does not generate any further interrupts to the application and the application thread processes any other completions that are added to the completion queue without overhead of system calls at least, for the duration of the sampling interval. Utilizing the edge mode and the associated sampling time interval allows the application thread and the interconnect device to handle the large bursts of completion data more efficiently than just using the IRQ mode, while increasing performance of the application thread because system calls and interrupt processing are avoided.

While clearing events at step 514, the application thread may deploy a hybrid mode, where urgent IO events are polled without interrupts and system calls, while non-urgent events are processed periodically in interrupt mode by waiting for events with a zero timeout. Examples of non-urgent events can be connection errors, port-up or port-down events, or connect and disconnect requests. Such events happen during application thread start-up or shut-down, or in transient cases when port errors occur and application instances are added or removed. The application thread is not allowed to starve these events since they affect connectivity state for existing and new applications, but they are not expected to happen in millions per second and do not have real-time requirements comparable to IO completions. For example, a reasonable period for handling such events can be defined to 50 milliseconds (20 times per second), while IO completions that result in significant CPU load start at 50,000 events per second. The hybrid mode allows to poll only descriptors that generate many events, while checking periodically for descriptors that generate rare non-urgent events.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for implementing intelligent input/output (I/O) operation completion modes in a high-speed network. A level mode optimizes short bursts of data to reduce CPU consumption and I/O latency for short bursts of data. The level mode works under assumption that, upon receiving a first completion, next completions are expected within at least a predetermined time interval. Applications may specify this value for each completion queue of the domain (zero value means the feature is not used) including arming and event file descriptor. An edge mode optimizes heavy loads, including specifying and modifying edge mode parameters, where edge mode parameters may be determined via calibration. Automatic switching between interrupt request mode, level mode, and edge mode may be based on one or more of application request, message rate, or application load. Switching from interrupt request mode to polling mode or from polling mode to interrupt request mode is also provided. A hybrid mode may also be implemented that utilizes a polling mode together with an IRQ mode for non-urgent requests.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for implementing intelligent input/output (I/O) operation completion modes in a high-speed network, the method comprising:

responsive to receiving a first indication, arming, by an interconnect device, an event channel descriptor that causes an event that is noticed by an application thread executing on a central processing unit in the data processing system and causes the application thread to enter a second mode of operation different from a first mode of operation;

responsive to noticing the event, arming, by the application thread, an arm mode descriptor thereby entering the second mode of operation;

processing, by the application thread, further completions that enter the completion queue without receiving further interrupts and without disarming the arm mode descriptor until a second indication is received indicating that the second mode of operation is to be exited; and responsive to receiving the second indication to exit the second mode of operation, disarming, by the application thread, the arm mode descriptor thereby exiting the second mode of operation and returning to the first mode of operation.

2. The method of claim 1, wherein the first indication is based on at least one completion of an I/O operation from an I/O device coupled to the data processing system entering a completion queue.

3. The method of claim 1, wherein the first indication is based on a number of processed completions over a last sampling interval being greater than or equal to a message rate at which the interconnect device is expected to produce significant load.

4. The method of claim 1, wherein the first indication is thread central processing unit usage over a last sampling interval being above a predetermined threshold and a number of empty calls to polling the interconnect device being below a poll rate at which polling the interconnect device will penalize the application thread.

5. The method of claim 1, wherein the second indication is a predetermined time interval expiring.

6. The method of claim 1, wherein the second indication is a number of processed completions over a last sampling interval being less than a message rate at which the interconnect device is expected to produce significant load.

7. The method of claim 1, wherein the second indication is thread central processing unit usage over a last sampling interval being equal to or below a predetermined threshold and a number of empty calls to polling the interconnect device being above a poll rate at which polling the interconnect device will penalize the application thread.

8. The method of claim 1, wherein the second mode of operation is a combination of a polling mode and an interrupt mode such that a set of non-urgent descriptors generate interrupt-driven events that are cleared periodically.

9. A computer program product comprising a computer readable storage medium having a computer readable program stored therein, wherein the computer readable program, when executed on a computing device, causes the computing device to:

responsive to receiving a first indication, arm, by an interconnect device in the computing device, an event channel descriptor that causes an event that is noticed by an application thread executing on a central processing unit in the computing device and causes the application thread to enter a second mode of operation different from a first mode of operation;

responsive to noticing the event, arm, by the application thread, an arm mode descriptor thereby entering the second mode of operation;

process, by the application thread, further completions that enter the completion queue without receiving further interrupts and without disarming the arm mode descriptor until a second indication is received indicating that the second mode of operation is to be exited; and responsive to receiving the second indication to exit the second mode of operation, disarm, by the application thread, the arm mode descriptor thereby exiting the second mode of operation and returning to the first mode of operation.

10. The computer program product of claim 9, Wherein the first indication is based on at least one completion of an I/O operation from an I/O device coupled to the data processing system entering a completion queue.

11. The computer program product of claim 9, wherein the first indication is based on a number of processed completions over a last sampling interval being greater than or equal to a message rate at which the interconnect device is expected to produce significant load; or thread central processing unit usage over a last sampling interval being above a predetermined threshold and a number of empty calls to polling the interconnect device being below a poll rate at Which polling the interconnect device will penalize the application thread.

12. The computer program product of claim 9, wherein the second indication is a predetermined time interval expiring.

13. The computer program product of claim 9, wherein the second indication is a number of processed completions over a last sampling interval being less than a message rate at which the interconnect device is expected to produce significant load; or thread central processing unit usage over a last sampling interval being equal to or below a predetermined threshold and a number of empty calls to polling the interconnect device being above a poll rate at which polling the interconnect device will penalize the application thread.

14. The computer program product of claim 9, wherein the second mode of operation is a combination of a polling mode and an interrupt mode such that a set of non-urgent descriptors generate interrupt-driven events that are cleared periodically.

15. An apparatus comprising:
a processor; and
a memory coupled to the processor, wherein the memory comprises instructions which, when executed by the processor, cause the processor to:

responsive to receiving a first indication, arm, by an interconnect device in the apparatus, an event channel descriptor that causes an event that is noticed by an application thread executing on a central processing unit in the apparatus and causes the application thread to enter a second mode of operation different from a first mode of operation;

responsive to noticing the event, arm, by the application thread, an arm mode descriptor thereby entering the second mode of operation;

process, by the application thread, further completions that enter the completion queue without receiving further interrupts and without disarming the arm mode descriptor until a second indication is received indicating that the second mode of operation is to be exited; and responsive to receiving the second indication to exit the second mode of operation, disarm, by the application thread, the arm mode descriptor thereby exiting the second mode of operation and returning to the first mode of operation.

16. The apparatus of claim 15, wherein the first indication is based on at least one completion of an I/O operation from an I/O device coupled to the data processing system entering a completion queue.

17. The apparatus of claim 15, wherein the first indication is based on a number of processed completions over a last sampling interval being greater than or equal to a message rate at which the interconnect device is expected to produce significant load; or thread central processing unit usage over a last sampling interval being above a predetermined threshold and a number of empty calls to polling the interconnect device being below a poll rate at which polling the interconnect device will penalize the application thread.

18. The apparatus of claim 15, wherein the second indication is a predetermined time interval expiring.

19. The apparatus of claim 15, wherein the second indication is a number of processed completions Over a last sampling interval being less than a message rate at which the interconnect device is expected to produce significant load; or thread central processing unit usage over a last sampling interval being equal to or below a predetermined threshold and a number of empty calls to polling the interconnect device being above a poll rate at which polling the interconnect device will penalize the application thread.

20. The apparatus of claim 15; wherein the second mode of operation is a combination of a polling mode and an interrupt mode such that a set of non-urgent descriptors generate interrupt-driven events that are cleared periodically.

* * * * *